United States Patent
Xie et al.

(10) Patent No.: US 11,535,101 B2
(45) Date of Patent: Dec. 27, 2022

(54) INTELLIGENT USER MANUAL SYSTEM FOR VEHICLES

(71) Applicant: Volvo Car Corporation, Gothenburg (SE)

(72) Inventors: Baojun Xie, Shanghai (CN); Daniel Yang, Shanghai (CN); William Miao, Shanghai (CN); Tianyun Chen, Shanghai (CN); Jianyun Jiang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 302 days.

(21) Appl. No.: 16/935,411

(22) Filed: Jul. 22, 2020

(65) Prior Publication Data

US 2021/0023945 A1 Jan. 28, 2021

(30) Foreign Application Priority Data

Jul. 26, 2019 (CN) .......................... 201910680718.2

(51) Int. Cl.
   *G06F 3/048* (2013.01)
   *B60K 35/00* (2006.01)
   *G06F 16/9032* (2019.01)

(52) U.S. Cl.
   CPC ........ *B60K 35/00* (2013.01); *G06F 16/90332* (2019.01); *B60K 2370/148* (2019.05); *B60K 2370/171* (2019.05)

(58) Field of Classification Search
   CPC ........ G06F 16/90332; B60K 2370/171; B60K 2370/148; B60K 35/00
   See application file for complete search history.

(56) References Cited

U.S. PATENT DOCUMENTS 8,484,015 B1 * 7/2013 Wolfram ............. G06F 16/3349
   704/10
11,212,241 B1 * 12/2021 Pace, Jr. ................ G06Q 40/02
   (Continued)

FOREIGN PATENT DOCUMENTS

| DE | 102007037493 A1 | 2/2009 | |
|---|---|---|---|
| EP | 1961606 A2 | 8/2008 | |
| EP | 1961606 A2 * | 8/2008 | ............. B60K 35/00 |

OTHER PUBLICATIONS

Nov. 24, 2020 Extended European Search Report issued on International Application No. 20186959.

*Primary Examiner* — Rashawn N Tillery
(74) *Attorney, Agent, or Firm* — Clements Bernard Walker; Christopher L. Bernard

(57) ABSTRACT

An intelligent user manual system for vehicles includes: a digital manual database; an input module including a voice input device which is configured to receive a voice input of the user; a recognition module communicatively connected with the input module and configured to recognize a query instruction input by the user via the input module; a processor module communicatively connected with the recognition module and the manual database and configured to perform a checking operation based on the user's query instruction that has been recognized by the recognition module; and an output module communicatively connected with the processor module and configured to output content to the user that has been obtained by the processor module.

11 Claims, 2 Drawing Sheets

(56) References Cited

U.S. PATENT DOCUMENTS

| | | | |
|---|---|---|---|
| 2005/0216458 A1* | 9/2005 | Morris | B60K 35/00 707/999.005 |
| 2011/0039236 A1* | 2/2011 | Asakura | B60K 37/06 434/62 |
| 2012/0185484 A1* | 7/2012 | Jones | G06Q 10/101 707/E17.069 |
| 2013/0218445 A1* | 8/2013 | Basir | G08G 1/0112 701/519 |
| 2014/0108013 A1* | 4/2014 | Di Cristo | G10L 15/22 704/254 |
| 2014/0229060 A1* | 8/2014 | MacNeille | B60R 16/037 701/36 |
| 2014/0279809 A1* | 9/2014 | Hershey | G06N 5/025 706/47 |
| 2015/0030998 A1* | 1/2015 | Liu | G09B 9/048 434/62 |
| 2017/0061826 A1* | 3/2017 | Jain | G09B 5/06 |
| 2019/0188218 A1* | 6/2019 | Harris | G06N 20/00 |
| 2019/0188326 A1* | 6/2019 | Daianu | G06F 9/453 |
| 2019/0200154 A1* | 6/2019 | Vishwanathan | G06K 9/6268 |
| 2019/0356552 A1* | 11/2019 | Ricci | H04W 12/088 |
| 2020/0167390 A1* | 5/2020 | Nakano | G10L 15/26 |
| 2020/0175789 A1* | 6/2020 | Rockwell | G07C 5/0808 |
| 2020/0193984 A1* | 6/2020 | Lee | B60K 37/06 |
| 2021/0232635 A1* | 7/2021 | Maeda | G10L 15/26 |
| 2021/0326104 A1* | 10/2021 | Maltsev | G10L 15/22 |

\* cited by examiner

INTELLIGENT USER MANUAL SYSTEM FOR VEHICLES

CROSS-REFERENCE TO RELATED APPLICATION

This application claims priority to CN Patent Application No. 201910680718.2, filed on Jul. 26, 2019, which is incorporated herein by reference in its entirety.

TECHNICAL FIELD

The present disclosure relates to an intelligent user manual system for vehicles configured to be queried by a user by voice.

BACKGROUND

Various functions have been developed by vehicle manufactures to improve the user experience in using the vehicles. Meanwhile, many new functions, especially electronic functions, are emerging. However, a user has to know various functions of the vehicle first before making use of them.

In general, a user learns various functions of the vehicle from the seller's instructions, from a website, from discussions with other vehicle owners, by reading a paper user manual, or by watching a video user manual. The user can certainly obtain comprehensive knowledge of the vehicle functions by reading a paper user manual or watching a video user manual, but this could be time consuming and even tedious. A paper user manual generally includes hundreds of pages, and a video user may be several hours long, so it is hard for a user to read or watch the full manual. Moreover, even if the user reads or watches the manual, the user may not remember or understand all the functions after all. Thus, many users do not know or understand some of the vehicle functions, which would negatively affect the user experience and their appreciation of their vehicles.

Further, in certain circumstances, a plurality of warning lights or icons are provided in the vehicles. For example, on the dashboard of a vehicle, a warning sign may be displayed to warn the driver of the status of abnormal status of certain functionality of the vehicle, such as engine failure. However, these warning lights are in the form of simple figures or icons, and many users do not know the meaning of them. When a warning light is activated, the user may not know which part of the vehicle is wrong and has to check the user manual to find the answer, which requires time and effort. In addition, if a warning light is activated while the vehicle is in operation, the driver has to keep driving and cannot read or reference the user manual simultaneously.

Thus, it is desired to provide a simple way to query interested vehicle functions or status.

SUMMARY

The disclosure is aimed at providing an intelligent user manual system, which can be used by users to conveniently query vehicle functions or status.

According to one aspect of the disclosure, an intelligent user manual system is provided, the user manual system including: a digital manual database; an input module including a voice input device which is configured to receive a voice input of the user; a recognition module communicatively connected with the input module and configured to recognize a query instruction input by the user via the input module; a processor module communicatively connected with the recognition module and the manual database and configured to perform a checking operation in the manual database based on the user's query instruction which has been recognized by the recognition module; and an output module communicatively connected with the processor module and configured to output content from the processor module to the user.

In one embodiment, the input module further includes a user manual input interface.

In one embodiment, the input module is further configured to communicate with an intelligent electronic device in which a corresponding APP is installed.

In one embodiment, the recognition module includes a voice recognition software.

In one embodiment, the processor module is a module in the vehicle computer, or an individual module communicatively connected with the vehicle computer.

In one embodiment, the output module includes at least an audio output device.

In one embodiment, the output module further includes a video output device.

In one embodiment, the output module is further configured to communicate with an intelligent electronic device in which a corresponding APP is installed so that the contents that have been obtained by the processor module can be transmitted to the user via the intelligent electronic device.

In one embodiment, the processor module is configured to output information about a vehicle function that has been obtained from the manual database to the user via the output module.

In one embodiment, the processor module is configured to determine an action that the user shall take by checking the manual database, and to output the action that the user should take to the user via the output module.

In one embodiment, the manual database includes one or more of text, picture, video and voice documents related with vehicle functions.

According to the disclosure, an intelligent user manual system is provided for a vehicle, by means of which, a user can query the interested vehicle functions or warning lights via a voice input interface, a manual input interface or an intelligent electronic device, and then detailed video and/or audio introduction to the general vehicle functions or the vehicle state indicated by an activated warning light as output. Thus, the users can obtain access to the content of interest in the user manual in a convenient, quick and precise manner.

DESCRIPTION OF EMBODIMENTS

Below some embodiments of the intelligent user manual system of the disclosure are described with reference to the drawings.

Figure 1:
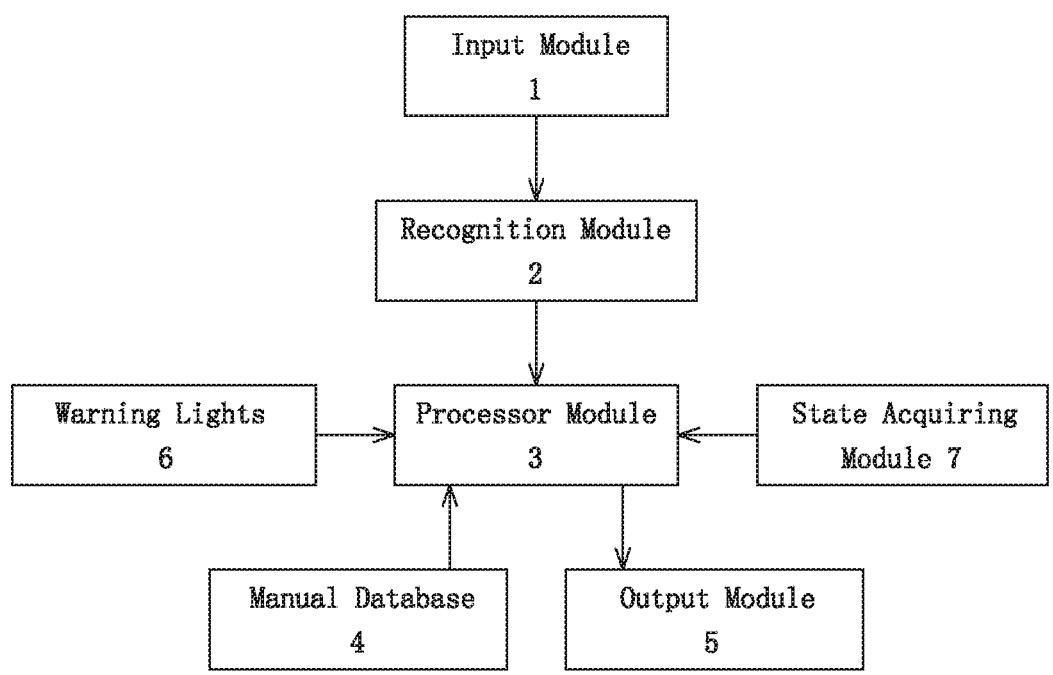
FIG. 1 is a schematic block view of an intelligent user manual system according to an embodiment of the disclosure.

FIG. 1 schematically shows an example of an intelligent user manual system of the disclosure, the intelligent user manual system includes: an input module 1; a recognition module 2 in communicative connection with the input module 1 and configured to recognize query instructions which are input by a user via the input module 1; a processor module 3 in communicative connection with the recognition module 2 and configured to perform a query operation based on the user's query instruction that has been recognized by the recognition module 2; a manual database 4 in communicative connection with the processor module 3 and configured to be checked by the processor module 3; and an output module 5 in communicative connection with the processor module 3 and configured to output the contents that the processor module 3 have accessed or checked from the manual database 4.

Optionally, the processor module 3 is further configured to query the activated state of each of warning lights 6 of the vehicle, for example, dashboard warning lights, and so the intelligent user manual system may further include: a state acquiring module 7 in communicative connection with the processor module 3 and configured to acquire a vehicle state corresponding to the activated warning light 6 from the manual database 4.

Further descriptions of examples of the above components are provided below.

First, the manual database 4 includes a digital file (such as text, picture, video and/or voice documents) about vehicle functions, which is stored in the vehicle computer or a separated in-vehicle memory or a cloud platform that is in wireless communication with the vehicle. The processor module 3 may be configured as a module in the vehicle computer, or be configured as an individual unit that is connected with the vehicle computer so that the processor module 3 can check the manual database 4 and other information from the vehicle computer, the separate memory or the cloud platform.

The input module 1 includes a voice input device, such as a microphone, mounted in the vehicle for receiving voice input from the user. By using the voice input device, the user can conveniently ask about information he or she wants to know.

Further, the input module 1 may also include a user manual input interface (for example, keyboard, touch screen, etc.), such as a manual input interface with a screen mounted in the vehicle. Where a manual input interface with a screen is used, optional items, indication items or the like can be provided when the user manually inputs queries.

Further, the input module 1 may be further configured to interconnect with (for example, via vehicle interconnection system) an intelligent electronic device, such as a mobile phone, in which a corresponding software application ("APP") is installed. The user can input queries by using the intelligent electronic device (by voice or manual input, etc.) via the input module 1.

The recognition module 2 includes a voice recognition software for recognizing the voice that the user inputted via the input module 1 and transforming the voice into a format that is readable by the processor module 3.

The processor module 3 is configured to read and analyze the user's voice information received from the recognition module 2 as well as information that may be inputted via the optional manual input interface or intelligent electronic device to determine whether the user is asking a question about a vehicle function or a warning light. When the processor module 3 determines that the user is asking a question about a vehicle function, the processor module 3 checks the content explaining the vehicle function from the manual database 4 and then delivers a response (e.g., based on information about the vehicle function) to the user via the output module 5. For example, when the processor module 3 determines that the user is asking a question about a warning light 6, the processor module 3 checks the vehicle state data related to the queried warning light 6 via the state acquiring module 7 (for example, from the vehicle computer, the separated memory or the cloud platform or from a corresponding sensor), possibly also checks the manual database 4, and then reports the detailed information about the vehicle state related to the warning light 6 to the user via the output module 5.

The output module 5 may includes a voice output device, such as a loudspeaker, mounted in the vehicle. Further, the output module 5 may also include a video output device. Where the input module 1 includes a manual input interface with a screen, the output module 5 may share the same screen with the input module 1.

The output module 5 may be also configured to communicate with the intelligent electronic device with a corresponding APP so that the user's query result can be output via the intelligent electronic device.

The warning lights 6 may include one or more of the warning lights (including icons) on the dashboard and/or warning lights mounted at other locations of the vehicle (inside and/or outside the vehicle). The warning lights represent the status of the vehicle, including one or more general vehicle statuses and abnormal statuses (including malfunctions). The general vehicle status includes: the amount of fuel, the amount of machine oil, the amount of brake liquid, the amount of coolant, the temperature of the radiator, the state of the brake system, the status of vehicle lights, the activation of various vehicle functions (for example, ABS, ESP, etc.), and the like. The abnormal status includes: a door being unclosed, a seat belt being unfastened, the manual parking brake unreleased, engine malfunction, battery malfunction, brake pad being in a state to be replaced, too low/high wheel tire pressure, and the like. When the user queries, the processor module 3 can report the corresponding state information to the user via the output module 5. For example, when the user finds that there is a warning light 6 activated, the user may ask "what is wrong with the vehicle?" The voice of the user is received by the input module 1 and then recognized by the recognition module 2. The processor module 3 determines the user's question via the recognition module 2 based on the recognized voice information, and then the processor module 3 checks which warning light 6 is activated and obtains the corresponding vehicle state data related with the activated warning light 6 via the state acquiring module 7. Then, the processor module 3 reports the corresponding vehicle state and a possible treatment or recommended action for the user to take. Alternatively or in addition, once the processor module 3 determines which warning light 6 is activated, the processor module 3 determines the corresponding vehicle state data related with the activated warning light 6 by checking the manual database 4, and optionally, also checks the contents of the treatment or recommended action that user shall take from the manual database 4.

It is noted that the intelligent user manual system of the disclosure can be activated automatically with the start of the vehicle so the intelligent user manual system can wait for the user's query once the vehicle is started. Alternatively, the intelligent user manual system of the disclosure is normally closed and includes an activating element by means of which the user can activate the intelligent user manual system.

Figure 2:
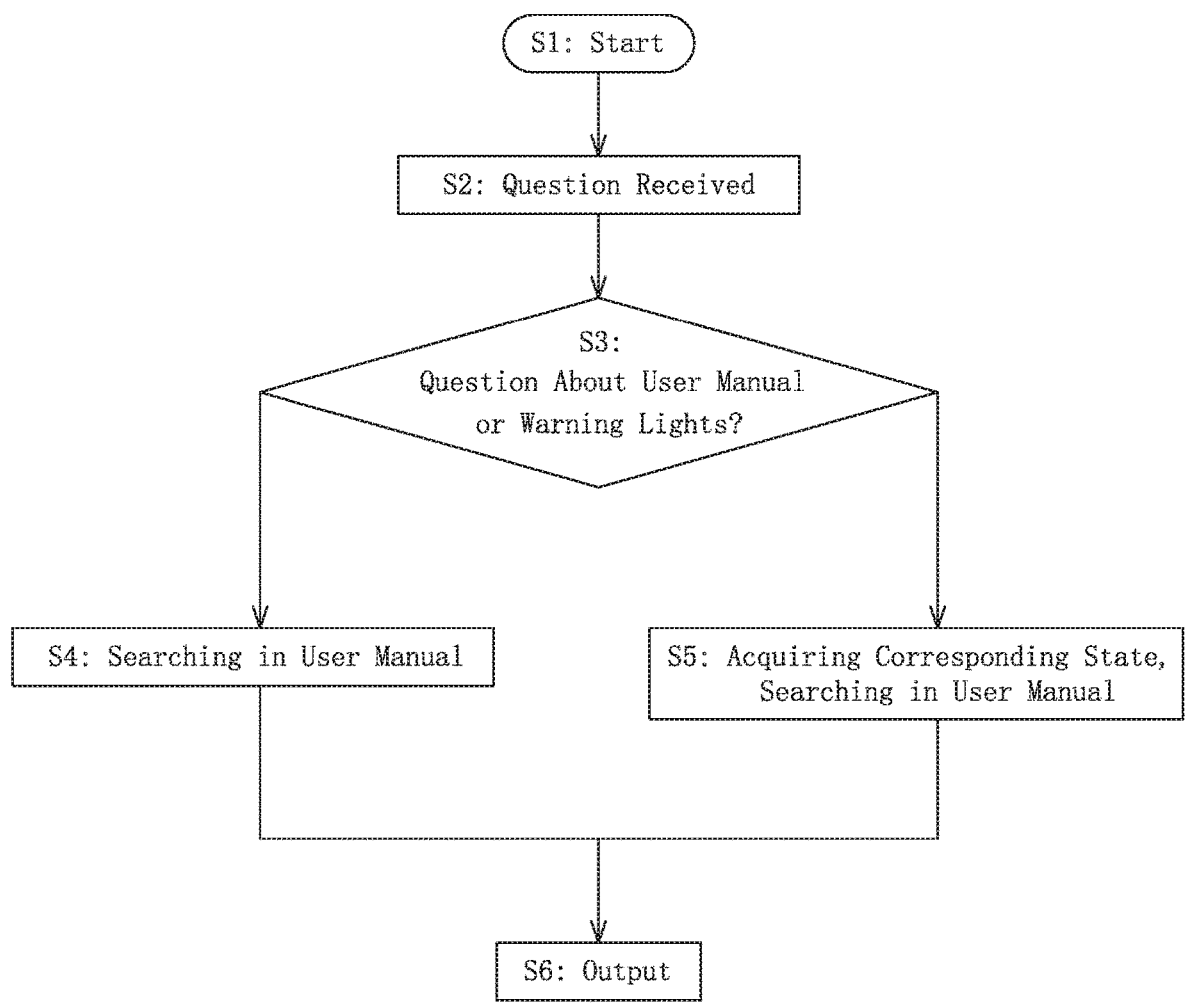
FIG. 2 is a schematic flow chart of a possible operation of the intelligent user manual system of the disclosure.

FIG. 2 schematically shows an exemplary process of how the intelligent user manual system of the disclosure operates.

First, in Step S1, the intelligent user manual system is activated. The intelligent user manual system is automatically activated with the start of the vehicle, or be activated by the user via the activating element. Once the intelligent user manual system is activated, it is in standby for the user's input of a question.

Next, in Step S2, the processor module 3 of the intelligent user manual system receives a user's input from the recognition module 2, recognizes the user's input and determines that the user has asked a question.

Next, in Step S3, the processor module 3 determines whether the user's question is about a vehicle function or about a warning light. If it determines that the user's question is about a vehicle function, the process goes to Step S4, and if it determines that the user's question is about a warning light, the process goes to Step S5.

In Step S4, the processor module 3 checks the manual database 4 based on the user's question about the vehicle function. In Step S5, the processor module checks which warning light is activated based on the user's question about the warning light, obtains the corresponding vehicle state information, and checks and/or obtains the response to the query in the corresponding content in the manual database 4.

After Step S4 or S5, the process goes to Step S6, in which the processor module 3 outputs the vehicle function queried by the user, or outputs the vehicle state related with the queried warning light (and possibly the treatment or recommended action that the user shall take), via the output module 5.

As described above, in the disclosure, vehicle functions are stored in the vehicle computer, a separated memory or a cloud platform in the form of a digital file, and input and recognition modules (voice type, etc.) are provided for inputting user's questions. According to the user's question, a technique of the disclosure includes accessing and checking for information regarding the relevant vehicle function and reported to the user, and possible suggestions and recommendations related to the query result will also be reported to the user. The user can conveniently access the vehicle functions of interest in the vehicle, and eliminates the need to read the paper user manual or watch the video user manual, so the user's time is saved, and the user's experience in using the vehicle is improved.

Further, for the solution that includes querying the warning lights, the user can immediately know the vehicle state, especially abnormal status (including malfunctions), by voice query so the user can take necessary actions in time to improve driving safety.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

The invention claimed is:

1. An intelligent user manual system for vehicles, comprising:
   a digital manual database stored in a vehicle computer;
   a vehicle state acquiring module included in the vehicle computer;
   an input module comprising a voice input device configured to receive a voice input of a user of a vehicle;
   a recognition module communicatively connected with the input module and configured to recognize a query input by the user via the input module;
   a processor module communicatively connected with the recognition module, the digital manual database and the vehicle state acquiring module, the processor module configured to determine whether the query input by the user is about a vehicle function or about an activated warning light; and
   an output module communicatively connected with the processor module and configured to output content prepared by the processor module to the user;
   wherein, if the query input is about the vehicle function, the processor module obtains information about the vehicle function from the digital manual database; and
   wherein, if the query input is about the activated warning light, the processor module obtains information about a vehicle state related to the activated warning light from both the vehicle state acquiring module and the digital manual database and information about an action for the user to take from the digital manual database.

2. The intelligent user manual system of claim 1, wherein the input module further comprises a user manual input interface.

3. The intelligent user manual system of claim 1, wherein the input module is further configured to communicate with an intelligent electronic device in which a corresponding APP is installed.

4. The intelligent user manual system of claim 1, wherein the recognition module comprises a voice recognition software.

5. The intelligent user manual system of claim 1, wherein the processor module is a module in the vehicle computer, or an individual module communicatively connected with the vehicle computer.

6. The intelligent user manual system of claim 1, wherein the output module comprises at least an audio output device.

7. The intelligent user manual system of claim 6, wherein the output module further comprises a video output device.

8. The intelligent user manual system of claim 6, wherein the output module is further configured to communicate with an intelligent electronic device in which a corresponding APP is installed so that the contents that have been obtained by the processor module can be transmitted to the user via the intelligent electronic device.

9. The intelligent user manual system of claim 1, wherein the processor module is configured to determine an action that the user shall take by checking the manual database, and to output the action that the user should take to the user via the output module.

10. The intelligent user manual system of claim 9, wherein the manual database comprises one or more of text, picture, video and voice documents related with vehicle functions.

11. The intelligent user manual system of claim 1, wherein the input module and the output module share an in-vehicle screen.

\* \* \* \* \*